United States Patent

[11] 3,576,938

[72] Inventors Frank A. Capotosto
Newtown Square, Pa.;
Robert V. Klint, Woodstown, N.J.
[21] Appl. No. 874,853
[22] Filed Nov. 7, 1969
[45] Patented May 4, 1971
[73] Assignee General Electric Company

[54] ELECTRICAL INSULATOR WITH POLYMER-CONTAINING JOINT BETWEEN THE PORCELAIN AND THE HARDWARE
6 Claims, 2 Drawing Figs.

[52] U.S. Cl. ................................................ 174/196,
161/184, 161/189, 161/192, 174/189, 264/60,
264/135, 264/255, 264/262, 287/189.365
[51] Int. Cl. .................................................. H01b 17/14,
H01b 17/38
[50] Field of Search ........................................ 174/176,
189, 196; 287/189.365; 29/470.9, 471.9, 472.9,
473.1; 264/60, 135, 255, 262, 264, 265, 274;
161/184, 189, 192

[56] References Cited
UNITED STATES PATENTS

| | | | |
|---|---|---|---|
| 1,284,975 | 11/1918 | Austin | 174/189X |
| 1,489,690 | 4/1924 | Austin | 174/189 |
| 2,173,292 | 9/1939 | Austin | 174/189 |

*Primary Examiner*—Laramie E. Askin
*Attorneys*—J. Wesley Haubner, William Freedman, Frank L. Neuhauser, Oscar B. Waddell and Joseph B. Forman

ABSTRACT: Discloses an electrical insulator that comprises an improved joint for attaching the insulator hardware to the porcelain body of the insulator. The porcelain has a roughened surface, and the joint comprises a thin release coating of solid polymeric material on the roughened surface, a thicker coating of a polymer filled with a dry lubricant overlying the release coating but unbonded thereto, and a filled polymer in the space between the hardware and thicker coating that is bonded to both the thicker coating and the hardware. The release coating prevents the thicker coating from adhering to the roughened surface of the porcelain but is so thin that the thicker coating is still able to mechanically interlock with the roughened surface.

PATENTED MAY 4 1971

3,576,938

INVENTORS:
FRANK A. CAPOTOSTO,
ROBERT V. KLINT,

BY William Freedman
ATTORNEY

ELECTRICAL INSULATOR WITH POLYMER-CONTAINING JOINT BETWEEN THE PORCELAIN AND THE HARDWARE

This invention relates to an electrical insulator comprising a porcelain body and hardware attached thereto and, more particularly, relates to an improved joint for attaching the hardware to the porcelain body. We are particularly concerned with an insulator of this type that is required to withstand repeated, high-impact loadings and wide temperature variations.

To provide a joint that can withstand repeated severe impacts, we use a high strength polymer, or resin, instead of the usual Portland cement, for attaching the hardware to the porcelain body. While the polymer itself has the strength successfully to withstand the severe impacts, we have found that if the polymer is rigidly bonded to the porcelain, the high impacts will produce cracks in the porcelain adjacent the polymer. These cracks will be enlarged by subsequent impacts, resulting in a powdering action in the region of the cracks which leads to premature loosening of the hardware.

An object of our invention is to provide a polymer-containing joint between the hardware and the porcelain that can withstand a high number of repeated severe impacts without such cracking of the porcelain.

In carrying out our invention in one form, we provide a porcelain insulator that has a roughened surface and between this roughened surface and the hardware, we provide a joint that comprises (1) a thin release coating of solid polymeric material on the roughened surface, (2) a thicker coating of a polymer filled with dry lubricant overlying said release coating but unbonded thereto, and (3) a polymer in the space between the hardware and thicker coating that is bonded to both the thicker coating and the hardware. The release coating prevents the overlying thicker coating from adhering to the roughened surface of the porcelain, but the release coating is so thin that the thicker coating overlying the release coating is still able to mechanically interlock with the roughened porcelain surface. Very minute movement of the thicker coating relative to the interlocked porcelain is still possible, but the dry lubricant allows such movement to occur without abrasion between the relatively moving surfaces.

For a better understanding of the invention, reference may be had to the following description taken in conjunction with the accompanying drawing, wherein.

Figure 1:
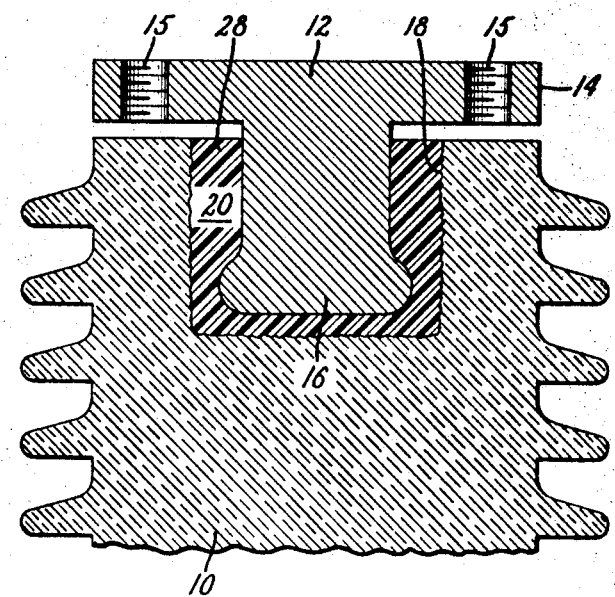
FIG. 1 is a cross-sectional view through an insulator embodying one form of our invention.

Referring now to FIG. 1, there is shown an electrical insulator comprising a porcelain body 10 and metal hardware 12 at the end of the porcelain body. Hardware 12 comprises a flange 14 to which suitable electrical apparatus is secured by screws (not shown) threaded into tapped holes 15 in the flange. Hardware 12 further comprises a plug portion 16 with an enlarged lower end.

Porcelain body 10 contains a recess 18 at one end in which plug portion 16 of the metal hardware is received. A joint 20 secures the plug 16 to the walls of recess 18. The surface of recess 18 to which the joint 20 is made is a sanded surface 22 of a conventional character. Such sanded surfaces are formed by coating the unfired clay body from which the porcelain is formed with a glaze and, while the glaze is still wet, sprinkling on it coarse particles of sand or a similar material. Thereafter, the clay body thus prepared is fired in a conventional manner to convert it to porcelain and to vitrify the glaze and bond the particles to the porcelain body.

Figure 2:
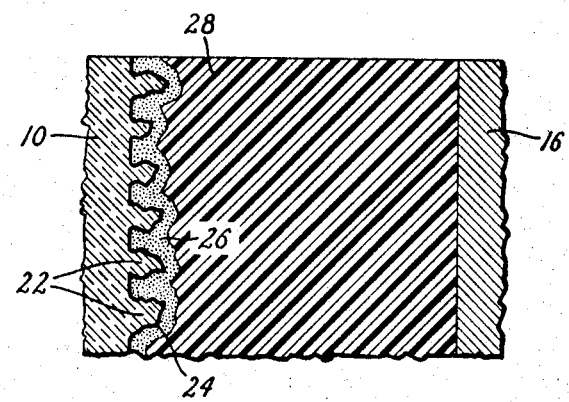
FIG. 2 is an enlarged view of a portion of FIG. 1.

Referring now to FIG. 2, as a first step in forming the joint, we coat the sanded surface 22 with a polymeric release coating 24 about 1 or 2 mils in thickness. This coating is either brushed on or sprayed on and is preferably a curing type of silicone release agent, such as Dow-Corning Company's R671 silicone release agent. The coating is so thin that it has little effect on the roughness of the sanded surface 22 inasmuch as the sand particles project from the underlying glaze by about one-sixteenth inch, as compared to the 1 or 2 mils thickness of the release coating. Another suitable material for the release coating is polytetra-fluoroethylene.

As the next step in forming the joint, we cover the release coating 24 with a layer of uncured polymer, such as an epoxy, filled with a dry lubricant such as graphite. Another suitable dry lubricant is molybdenum disulfide. The polymer forming the second layer is applied in a highly viscous condition either by brushing it on or extruding it on through a suitable nozzle. The second layer is about 30 mils in thickness and is shown at 26 in FIG. 2.

The porcelain body with these two coatings 24 and 26 on the surfaces of its recess 18 is then suitably heated in an oven to effect a partial cure of the coatings. The porcelain body is then removed from the oven and the metal hardware 14 is suitably positioned thereon with plug 16 seated in recess 18.

Thereafter, an uncured polymer or resin is poured into the space between plug 16 and the coated wall of recess 18 through a suitable passage (not shown). This polymer, which is shown as 28, fills the remaining space in the recess. Then, the insulator is returned to the oven and the temperature raised to a sufficiently high level to completely cure the various polymers present in the joint. The polymer 28 is preferably a rigid epoxy resin filled with a suitable inorganic filler such as zircon.

During the curing process, a bond is formed between the polymer 28 and the polymer in layer 26 and also between polymer 28 and the metal hardware 16. No bond is formed, however, between the polymer in layer 26 and the release coating 24.

In the final joint the release coating 24 serves to prevent the polymer in coating 26 from adhering to the sanded surface of the porcelain. The coating 24 is so thin, however, that the coated surface is virtually as rough as the original uncoated surface, thus enabling the polymer in the overlying coating 26 to extend into and fill the valleys between the particles on the porcelain surface and to thus mechanically interlock with the particles. When the joint is subjected to impact loads, this interlocking precludes all relative movement between the coating 26 and the sanded surface 22 except for a very slight amount referred to herein as micromovement. The solid lubricant in the polymer coating 26 allows this micromovement to occur without abrasion between the sanded surface and the polymer, maintaining a low coefficient of friction between these components. We have found that without this lubricant, impacts have produced a grinding or dusting action of both the sand and the polymer, which after a comparatively small number of impacts have caused loosening of the hardware.

With a graphite lubricant present in the layer 26, our joint has typically been able to withstand over 2500 severe impacts applied transversely of the longitudinal axis of the insulator with no observable loosening or other damage. But without the lubricant present, loosening typically occurred after only about 750 impacts of the same severity applied in the same direction.

Joints were also made containing no release coating 24 but with the graphite-filled layer 26 present. Insulators with such joints were tested and found typically to be able to withstand less than 100 impacts of the same severity and direction as in the immediately preceding paragraph. Additional joints were made in which the epoxy material 28 was bonded directly to the porcelain surface 22 and coatings 24 and 26 were both omitted. These joints could typically withstand only about 100 such impacts. In insulators with each of these latter two joints, failure resulted from cracking of the porcelain adjacent the joint.

It is to be noted that all the components of our joint are solids of high mechanical strength and stability. There are no liquids present nor any waxes or greases which could yield and allow creepage or deformation in the joint.

Our joint has demonstrated that it is highly stable over the wide temperature range extending between −40° C. and 125° C. No decomposition or deterioration of its component materials is produced by thermal cycling over this wide temperature range.

The zircon filler in the epoxy resin 28 serves to reduce the coefficient of thermal expansion of the resin, imparting to the resin a coefficient of thermal expansion more nearly matching that of the porcelain, thus precluding undue mechanical stresses from being set up as a result of large temperature changes.

Although we have shown the insulator as comprising a porcelain member receiving the metal hardware in a recess, the invention in its broader aspects comprehends other configurations such as metal hardware surrounding the porcelain with a joint such as 20 between these parts. Although we prefer to use an epoxy resin for components 26 and 28, other suitable resins can be used, e.g., rigid polyester resins.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

We claim:

1. An insulator comprising:
   a. a porcelain member having a recess therein, the recess having a surface roughened by particles thereon integral with the surface,
   b. a thin release coating of a solid polymeric material on the roughened surface,
   c. a thicker coating of a polymer filled with a dry lubricant on said release coating but unbonded thereto,
   d. said release coating being so thin that the polymer of said thicker coating extends into the valleys between said particles and mechanically interlocks with said particles,
   e. hardware having a portion disposed within said recess,
   f. and a polymer substantially filling the space between said hardware portion and said thicker coating and bonded to said hardware portion and said thicker coating,
   g. said space-filling polymer containing a filler that reduces the coefficient of thermal expansion of said latter polymer.

2. An insulator comprising:
   a. a porcelain member having a surface roughened by particles thereon integral with said surface,
   b. a thin release coating of a solid polymeric material on the roughened surface,
   c. a thicker coating of polymer filled with a dry lubricant on said release coating but unbonded thereto,
   d. said release coating being so thin that the polymer of said thicker coating extends into the valleys between said particles and thus mechanically interlocks with said particles,
   e. hardware having a portion adjacent but spaced from said roughened surface,
   f. a polymer in the space between said hardware portion and said thicker coating and bonded to said hardware portion and said thicker coating,
   g. said latter polymer containing a filler that reduces the coefficient of thermal expansion of said latter polymer.

3. The insulator of claim 2 in which said release coating is of a silicone resin or polytetrafluoroethylene.

4. The insulator of claim 2 in which the lubricant of said thicker coating is graphite or molybdenum disulfide.

5. The insulator of claim 2 in which the polymer of said thicker coating and the polymer between said thicker coating and said hardware portion are epoxy resins.

6. The insulator of claim 2 in which the polymer of said thicker coating and the polymer between said thicker coating and said hardware portion are polyester resins.